United States Patent
Zaguroli, Jr.

[11] Patent Number: 5,921,368
[45] Date of Patent: Jul. 13, 1999

[54] LINKED CARRIER GRAVITY CONVEYOR

[75] Inventor: James Zaguroli, Jr., Drayton Plains, Mich.

[73] Assignee: Knight Industries, Inc., Auburn Hills, Mich.

[21] Appl. No.: 08/805,766

[22] Filed: Feb. 25, 1997

[51] Int. Cl.⁶ ................................................. B65G 11/00
[52] U.S. Cl. ........................ 193/2 D; 198/678.1; 198/838
[58] Field of Search .......................... 193/2 D; 198/678.1, 198/838, 562

[56] References Cited

U.S. PATENT DOCUMENTS

| | | | |
|---|---|---|---|
| 344,169 | 6/1886 | Day | 193/2 D |
| 463,178 | 11/1891 | Vanderburg | 193/2 D |
| 1,458,313 | 6/1923 | Sergeant | 193/2 D |
| 3,967,712 | 7/1976 | Waitkins et al. | 193/1 |
| 4,380,959 | 4/1983 | Brens et al. | 198/867.14 X |
| 5,590,756 | 1/1997 | Zaguroli, Jr. | 198/795 |
| 5,718,320 | 2/1998 | Marquier et al. | 198/678.1 |

FOREIGN PATENT DOCUMENTS

| | | | |
|---|---|---|---|
| 625894 | 1/1936 | Germany | 193/2 D |
| 1167267 | 4/1964 | Germany | 198/678.1 |
| 38312 | 6/1936 | Netherlands | 193/2 D |
| 386812 | 10/1973 | U.S.S.R. | 198/838 |
| 1546360 | 2/1990 | U.S.S.R. | 198/678.1 |
| 908724 | 10/1962 | United Kingdom | 198/678.1 |

*Primary Examiner*—Janice L. Krizek
*Assistant Examiner*—Thuy V. Tran
*Attorney, Agent, or Firm*—John R. Benefiel

[57] ABSTRACT

A gravity conveyor has a train of spaced apart load carriers distributed around a closed circuit trackway. The trackway is inclined downwardly from a loading end to an unloading end. The carriers are connected together into a train by segments of chain, so that removal of a load at the unloading end causes advance of load carriers along a lower track of the trackway. The chains are connected to protruding portions of the carrier to be away from the trackway, avoiding any frictional drag of the chain.

6 Claims, 3 Drawing Sheets

LINKED CARRIER GRAVITY CONVEYOR

BACKGROUND OF THE INVENTION

This invention concerns conveyors and more particularly gravity conveyors in which load carrying carriers roll down an inclined lower track from a loading end to an unloading end of the track, the carriers returned on a reversely elevated inclined return track back to the loading end.

The present inventor has previously patented a gravity conveyor in which a power mechanism pushes each carrier around a partially circular end track which curves upwardly from the unload end of the lower track to the upper end of the return track. The upper track is inclined down towards the loading end of the conveyor to be converging with the lower track at the loading end so that the carriers by gravity roll back to the loading end. See U.S. Pat. No. 5,590,756 issued on Jan. 7, 1997.

In another known gravity conveyor, the lower and upper tracks are parallel to each other, and both are inclined downwardly from the loading end to the unloading end of the conveyor. Instead of powering the carrier movement to the upper track and using a downward inclination of the upper track to return the carriers, the carriers are all linked together into a train by a roller guided chain routed within the tracks.

By linking the carriers together, an equilibrium condition is reached when all the carriers on the lower track are loaded, the weight of the loaded carriers on the lower track pulling through the chain on a lead loaded carrier to cause it to partially ascend up the curved return track section at the unload end. The weight of the load on the lead carrier balances the component of the weight of the train of loaded carriers on the lower track directed down the lower tracks. When the load is removed from the lead carrier, this equilibrium is upset and the other load carriers are advanced sufficient to cause a new lead carrier to ascend the track end and reestablish the equilibrium position down the track when a load is placed on the last carrier at the loading end.

Thus, the carriers are successively pulled incrementally around the unloading end tracks in increments and also pulled up along the inclined upper track back to the loading end in the same fashion, as load items are removed at the unload end and added at the load end. However, this conveyor, using a heavy roller guided chain in the track, generates considerable friction. This friction can lead to sluggish performance of the conveyor and prevent use of the conveyor with loads that are too light to overcome the friction.

The cost of the conveyor is also increased by the cost of the roller guided chain.

Another drawback of this previously known conveyor is that the end tracks are constructed of formed extrusion sections of the same configuration as that of the upper and lower tracks, requiring a large radius of the end tracks since the tracks cannot be formed into a tight radius. This increases the bulk of the conveyor.

It is an object of the present invention to provide a linked carrier gravity conveyor of the type described in which chain friction caused by dragging of the chain in the trackway is eliminated.

Another object of the present invention is to provide a linked carrier gravity conveyor of the type described which is simpler and less costly than previous such conveyors.

SUMMARY OF THE INVENTION

These and other objects of the present invention are achieved by a gravity conveyor in which a portion of each carrier protrudes from the tracks of a trackway, these protruding portions connected with short segments of flexible elements such as short lengths of chain. The flexible elements are positioned sufficiently far from the tracks such as to not engage any of the track surfaces to thus eliminate any friction between the tracks and the chain lengths.

The combined length of the chain segments and the carrier is made slightly larger than the distance around the perimeter of the trackway to insure that no binding occurs as the carriers move around the trackway, and so that the chains do not contact any surfaces and create frictional drag.

The carriers are themselves guided in the tracks by roller sets so that the chain lengths need not be guided, but can merely be hung between successive carriers in the train.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
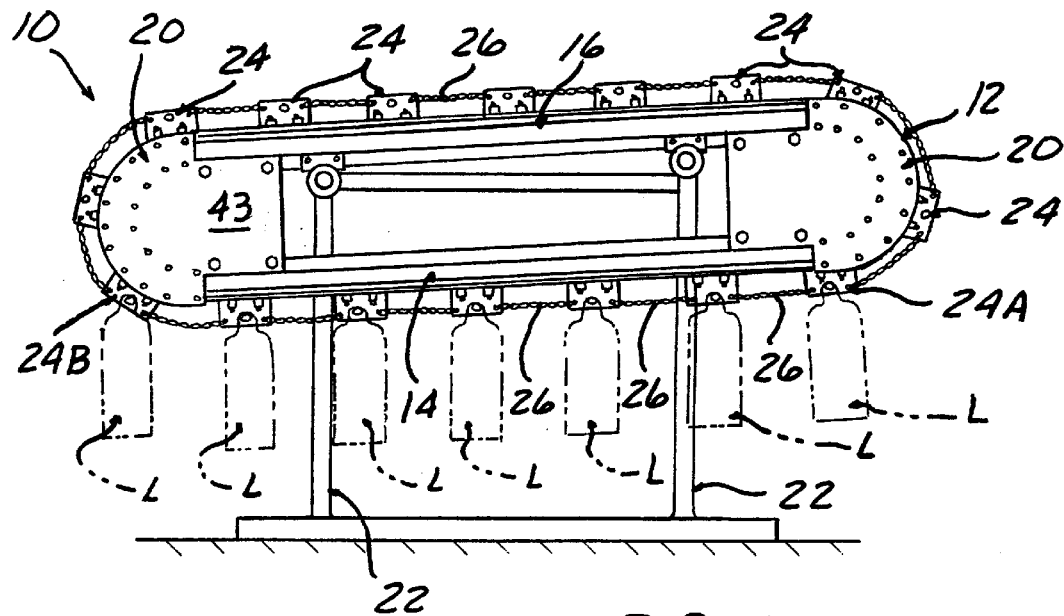
FIG. 1 is a front elevational view of the gravity conveyor according to the present invention.

Referring to the drawings and particularly FIG. 1, the gravity conveyor 10 according to the present invention comprises a closed circuit trackway 12 comprised of a straight lower track 14, a parallel straight upper track 16, partially circular loading end track 18 at the right side of upper and lower tracks 14, 16, and partially circular unloading end track 20 at the other end of upper and lower tracks 14, 16. The trackway 12 is supported on a pair of support posts 22 so as to be inclined downwardly from the load end track 18 to the unloading end track 20.

A series of roller mounted load carriers 24 are distributed around the circuit, each supported by spaced pairs of roller sets running along support surfaces designed within the respective tracks 14, 16, 18, 20, described below.

The load carriers 24 each have a portion protruding well out of the trackway 12 at each point therealong.

The load carriers 24 are all interconnected by having short chain segments 26 attached at either end to loading and trailing ends of the protruding portion of each adjacent load carrier 24, so as to be positioned completely clear of the trackway 12 as shown, forming a train of carriers.

Loads L are hooked to each load carrier 24 on the lower track 14, as well as the trailing load carrier 24A on the loading end track 20 and the lead load carrier 24B on the unloading end track 18.

In this condition, an equilibrium condition is reached, in which the component of the aggregate weight of the loads L on the lower track 14 and the load on carrier 24A having a component acting in a direction along the track pulls on the chain segments 26 to exert an upward force on the first load carrier 24B on the end track 18, causing the loaded carrier 24B to partially ascend the end track 18 as shown.

When the load on carrier 24B is removed, this equilibrium is upset and the aggregate weight of the loads L acting through the chain segments 26 causes the next behind carrier 24 to partially ascend the end track 18. When the next load L is loaded on the now trailing loaded carrier 24A, a new equilibrium condition is reached.

Thus, the loads L can be moved by gravity from the load end to the unload end, with the load carriers 24 incrementally recirculating about the trackway 12. The chain segments 26 do not contact any trackway surface so that drag friction is completely avoided, insuring free movement of the carrier train.

It is noted that the component of the weight of the carriers 24 themselves acting down the tracks is neutral, as the reversely acting weight of the carriers on the upper track 16 is balanced by the forward acting weight of the carriers 24 on the lower track 14, as are the carriers 24 on the end tracks 18, 20.

Figure 2:
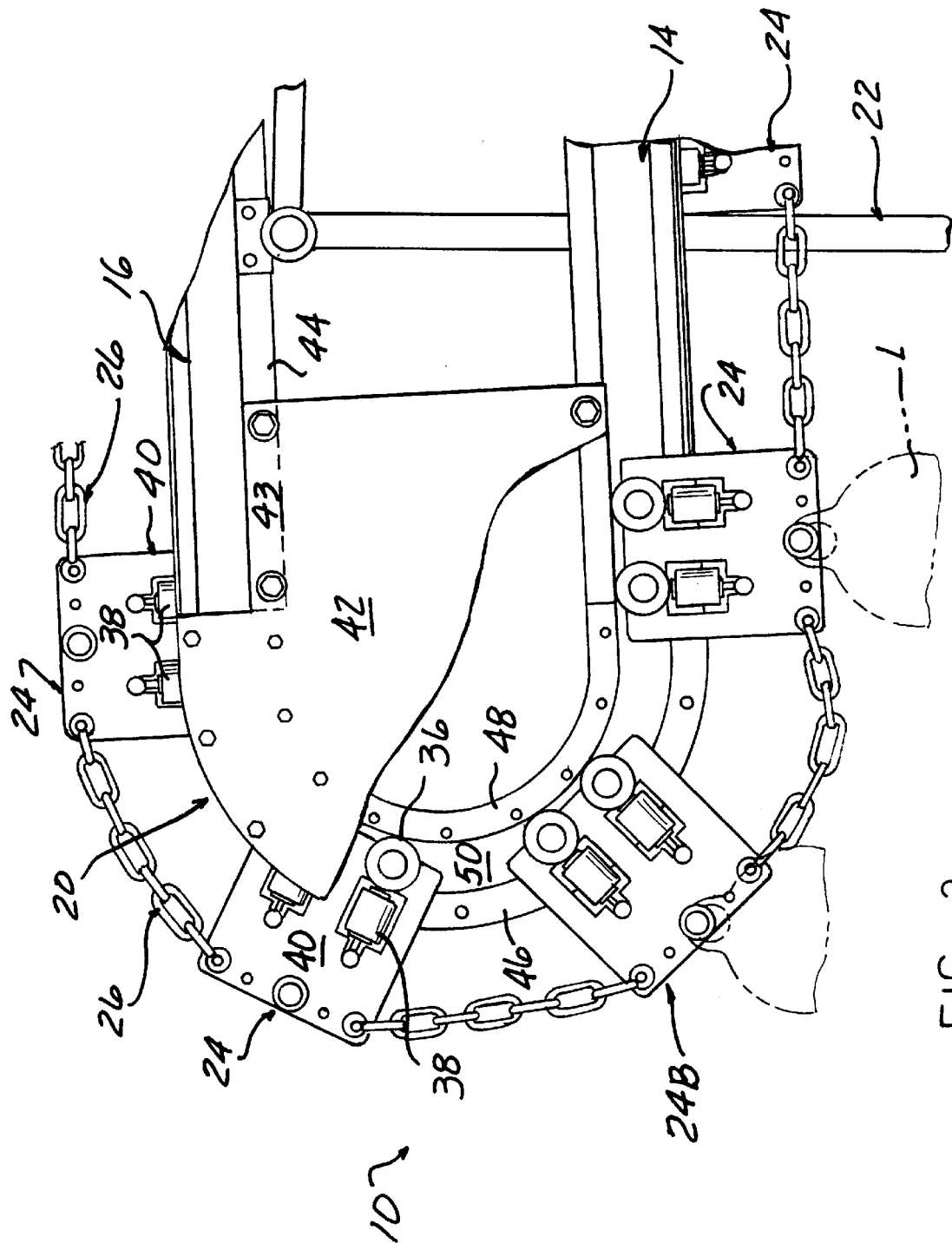
FIG. 2 is an enlarged fragmentary front elevational view in partial section of the unload end of the conveyor shown in FIG. 1.

Referring to FIG. 2, the total length of the chain segments 26 and the width of the intervening spaces on the load carriers 24 define a distance which is slightly greater than the distance around the perimeter of the trackway 12 so that slack develops between the last forward pulling load carrier and the ascending load carrier 24B. This insures that there is no tension in the chain segments 26 caused by the interconnection itself, which would increase the friction in the system. The protruding portions of the load carriers 24 spread apart when moving into the end tracks 18, 20, while the portions in the end tracks 18, 20 move closer together, such that the chain segments 26 remain stretched.

The construction of the conveyor 10 allows smaller radius end tracks 18, 20. The upper and lower tracks 14, 16 comprise straight aluminum extrusion sections which are inverted with respect to each other.

Figure 3:
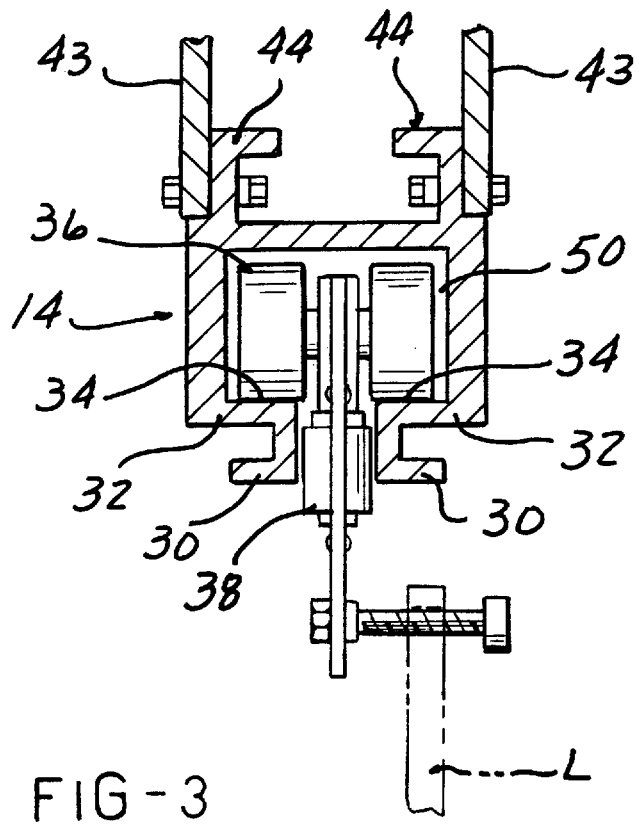
FIG. 3 is a fragmentary view of a cross section of the lower track showing a load carrier disposed therein.
Figure 6:
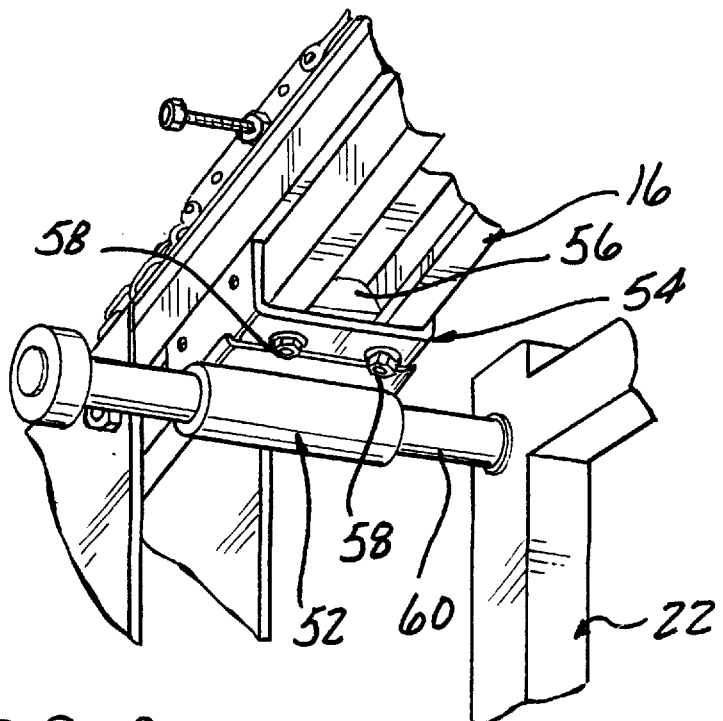
FIG. 6 is a fragmentary perspective view of a section of the upper track and support post showing the connection therebetween.

FIG. 3 shows the sectional shape of the lower track 14 which includes a box having an open slot on the bottom, bounded by a pair of outwardly facing inverted L webs 30. The lower wall 32 defines a surface 34 along which pairs of roller sets 36 of each load carrier 24 run.

Figure 5:
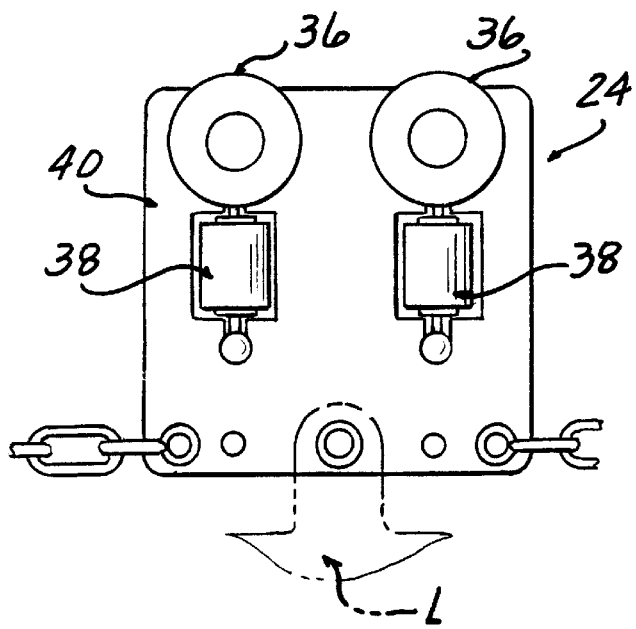
FIG. 5 is a front view of a load carrier with portions of attached connecting chain segments.
Figure 4:
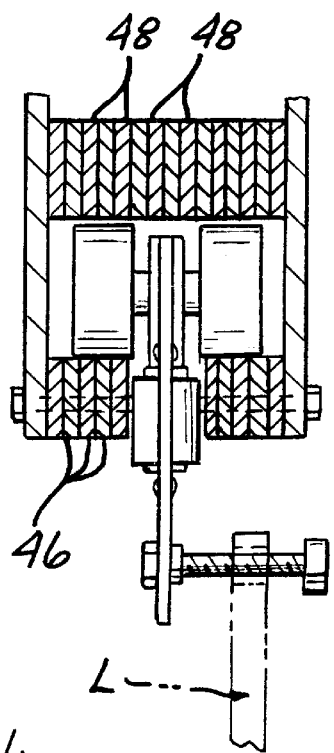
FIG. 4 is a fragmentary view of a cross section taken through an end track showing a load carrier disposed therein.

Vertical guide rollers 38 on each load carrier 24 engage the inward facing surfaces defined by the L webs 30. The rollers 36 and 38 are mounted to a central plate structure 40 forming the main structure of each load carrier (FIG. 5).

The end tracks 18, 20 each include flat cover plates 42 having sections 43 overlying and bolted at the top and bottom to webs 44 on the upper and lower tracks 14, 16. Stacks of aligned arcuate plates 46, 48 are screwed to the inside of each cover plate 42 defining an arcuate roller space 50 corresponding to the box area of the extrusions defining upper and lower tracks 14, 16. Each arcuate roller space 50 is aligned with the corresponding roller spaces of the upper and lower tracks 14, 16.

The support posts 22 each have a pin 60 extending horizontally beneath the upper track 16, passing through a sleeve 52 welded to a U piece 54, which wraps around the webs 44. An inner sliding clamping block 56 receives bolts 58 passed through the U piece 54 to be clamped in position.

I claim:

1. A gravity conveyor comprising:

a closed circuit trackway including an upper straight track;

a parallel lower straight track;

a loading end track attached to said upper and lower tracks at one end thereof; and, an unloading end track attached to said upper and lower tracks at the other end thereof;

support means holding said trackway to incline said upper and lower tracks downwardly from said loading end track to said unloading end track;

each of said upper, lower and end tracks defining roller spaces aligned to extend around said trackway, a slot extending out of each of said roller spaces;

a train of spaced apart load carriers distributed around said trackway, each load carrier having a portion carrying rollers guided within said roller spaces and also having a portion protruding through said slots;

means for suspending a load from said protruding portion of each load carrier; and, an elongated element pivotally interconnecting each successive load carrier in said train, each said element connected to said protruding portion of each of said load carriers so as to be located away from said trackway and free from contact with said trackway.

2. The gravity conveyor according to claim 1 wherein said elements are flexible.

3. The gravity conveyor according to claim 2 wherein said elements comprise lengths of chain.

4. The gravity conveyor according to claim 1 wherein said load carriers include guide rollers disposed in said slots to guide said load carrier therein.

5. The gravity conveyor according to claim 1 wherein said end tracks include concentric stacks of arcuate plates defining said roller spaces therein.

6. The gravity conveyor according to claim 1 wherein an aggregate length comprised of the combined width of said protruding portions of said load carriers in said train whereat said elements are attached and the combined lengths of said connecting elements are slightly greater than the combined distance around said trackway at the level of said connecting elements.

* * * * *